March 6, 1951 J. H. BOOTH 2,544,584
BALL JOINT
Filed Oct. 24, 1947
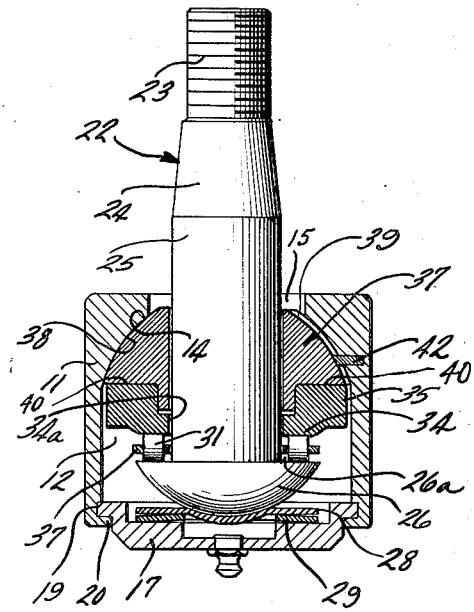
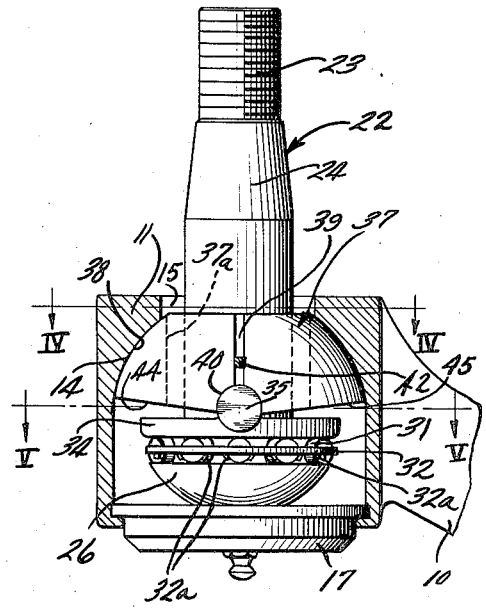
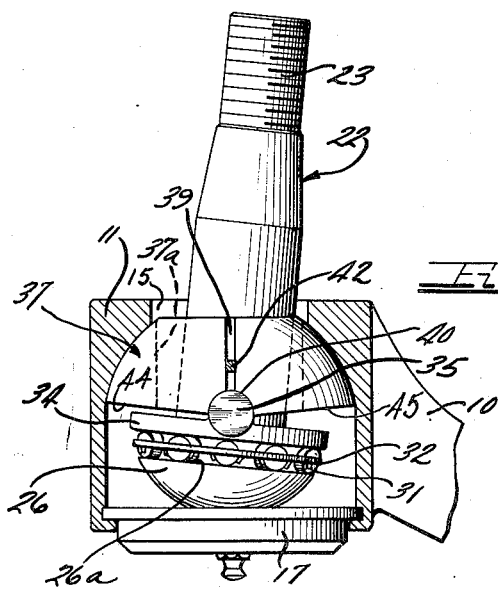
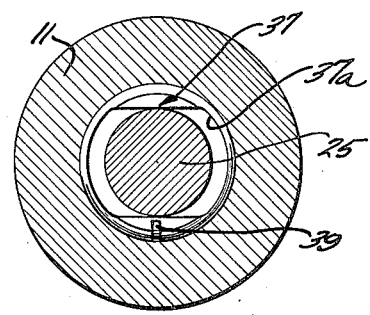
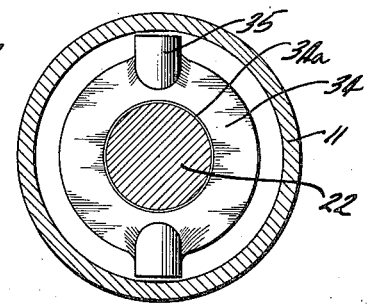
Inventor
JAMES H. BOOTH
The Firm of Charles W. Hill,
by Attys.

Patented Mar. 6, 1951

2,544,584

UNITED STATES PATENT OFFICE 2,544,584

BALL JOINT

James H. Booth, Corunna, Mich., assignor to Thompson Products, Inc., Cleveland, Ohio, a corporation of Ohio Application October 24, 1947, Serial No. 781,999

10 Claims. (Cl. 287—90)

1

This invention relates to a joint accommodating relative rotation and relative tilting movement of the parts on separate sets of bearing surfaces.

More particularly this invention relates to joint constructions wherein the joint studs are rotatably mounted on anti-friction bearings and tiltably mounted on other bearings.

The ball joints of this invention are particularly adapted for use in front wheel suspensions of automotive vehicles, since, not only will they function efficiently even when heavily loaded, but also, they are arranged to provide free rotation of the ball stud upon its own axis and universal pivoting of this stud in the joint housing.

In knee action type front wheel suspensions, ball joint mountings are desirable between the suspension control arms and the wheel steering mechanism to provide a stud arrangement which will rotate freely to accommodate free steering of the road wheels and will tilt in one plane through a wide range to accommodate the knee action and also to accommodate camber adjustments and will tilt in another plane to accommodate caster adjustments. According to this invention, a ball joint is now provided which will accommodate all these movements of the stud on separate independent bearings.

The preferred joint of this invention has a housing with an inverted cup shaped cavity, receiving therein the rounded, button end of a joint stud, the other end of which projects out of the joint housing. The stud is mounted for rotation on an anti-friction bearing assembly which employs a shoulder of the button end of the stud as a raceway. Tilting of the stud in one plane is provided by a ring shaped member encircling the shank of the stud, supported on the anti-friction bearing and having trunnions extending outwardly to engage in pivoting relation a bearing member which is mounted in the housing. This bearing member has a segmental spherical bearing surface which is pivotally disposed on a similar surface of the housing, but is confined for pivoting in a single plane, at substantially right angles to the plane defined by pivoting on the trunnion, by a pin extending inwardly from the housing into a groove in the spherical surface of the bearing member.

Thus, the ball stud of the joint in this invention can rotate freely about its own axis and can pivot in either of two planes, independently of its movement in the other plane.

It is, therefore, an object of this invention to provide a joint structure having a stud rotatable about its own axis on anti-friction bearings and

2 pivotable in one plane on a segmental spherical bearing surface and in another plane on trunnions.

It is another object of this invention to provide a ball joint with a stud mounting capable of carrying a considerable thrust load and still permitting free rotation of the stud.

A further object of this invention is to provide a heavy duty ball joint structure having three separate pairs of bearing surfaces accommodating different articulating movements of the joint, which joint is especially well adapted for use in wheel suspension mechanisms.

It is a specific object of this invention to provide a joint construction adaptable for front wheel suspension in which a stud is disposed for rotation about its own axis on anti-friction bearings and is arranged for tilting in two different planes independently of each other to accommodate purposely designed misalignments of the upper and lower control arms as well as inadvertent misalignments and whereby tilting in one plane accommodates adjustments for caster and tilting in the other plane accommodates adjustments for camber and knee action.

Other and further objects of this invention will become apparent to those skilled in the art from the following detailed description of the annexed sheet of drawing which discloses a preferred embodiment of the invention.

On the drawing:

Figure 1 is a vertical cross sectional view, with parts shown in elevation, of a joint structure according to this invention;

Figure 2 is a vertical cross sectional view, with parts in elevation taken at substantially right angles to the view of Figure 1;

Figure 3 is a vertical sectional view, similar to Figure 2, but showing the stud in a tilted position;

Figure 4 is a horizontal sectional view, taken substantially on line IV—IV of Figure 2; and Figure 5 is a horizontal sectional view, taken on line V—V of Figure 2, with parts in elevation.

As shown on the drawing:

The reference numeral 10 of Figures 2 and 3, designates generally a control arm of an independently suspended wheel structure. The arm 10 has an inverted cup-shaped end portion 11 also shown in Figure 1, defining a cavity or chamber 12 and provided near one end of the cavity with a segmental spherical bearing surface 14 converging to an opening 15. The opposite open end of the chamber 12 is closed by a plate 17 seated in a groove 19 formed within the housing walls. The plate 17 is held in position by peening or spinning over the edge of the cup shaped end portion 11 as indicated at 20.

A stud member 22 having a threaded end portion 23, a tapered intermediate portion 24, a cylindrical shank portion 25 adjacent the tapered portion and an enlarged segmental spherical button end 26 is mounted in the joint housing with the button end 26 in bearing relation on a spring seat 28 which is urged against the end 26 by a spring washer 29, pressed between the spring seat 28 and the closure plate 17.

Rotation of the stud about its own axis is provided by a plurality of roller bearing elements 31 secured in spaced circumferential relation by a retainer ring 32. As seen in Figure 2, the roller bearing elements are held in place in the retainer 32 by tabs 32a bent out from the retainer ring. A raceway is provided for the roller bearings by a ring shaped member 34 which has a central aperture 34a adapted to reecive the shank portion of the stud and has a pair of diametrically opposed trunnions 35 extending outwardly from the main part of the ring member. The other raceway for the roller bearings is afforded by a shoulder portion 26a on the button end 26 of the stud 22. Thus, the roller bearings are confined between the stud end and the ring member 34, permitting free rotation about its own axis.

A bearing seat member 37, having a segmental spherical outer surface 38, is disposed in contact with the spherical bearing surface 14 of the housing 11. The seat 37 has an elongated aperture 37a therethrough receiving the shank 25 of the stud 22 permitting the stud to pivot therein in one plane without moving the member 37 but engaging the member 37 to carry it therewith when tilted in a plane at right angles thereto.

The bearing member 37 has a pair of diametrically opposed substantially semi-cylindrical recesses 40 which are adapted to receive the trunnions 35 of the ring member 34 in pivoting relation. Thus, the stud 22 and the roller bearing assembly can pivot bodily, as seen in Figure 3, relative to the bearing member 37 on the trunnion 35. It is to be particularly noted that in the pivoting position illustrated in Figure 3, the roller bearings are still disposed in a plane substantially perpendicular to the axis of the stud 22. Thus, the roller bearings even in the tilted position maintain their advantageous disposition for free rotation of the stud.

Tilting of the stud member 22 about the trunnion 35 will accommodate knee action movements of the suspension mechanism and adjustment for camber. To accommodate adjustment for caster, misalignment of control arms of the wheel suspension, and the like, it is necessary that the stud 22 pivot in a plane at substantially right angles to that which accommodates adjustment for camber. To accomplish this, a groove 39 is provided in the spherical bearing surface 38 of the bearing seat member 37 directly above one of the trunnion receiving recesses 40. A pin 42 secured in an opening in the housing extends inwardly into the cavity 12 and is arranged to fit into the slot 39. Thus, the bearing member 37 may pivot on the spherical bearing surface 14 of the housing 11 only in the direction dictated by the pin and slot. As previously mentioned, this slot is arranged to guide the bearing member 37 for tilting in a plane which will accommodate adjustment for caster.

The bearing member 37 has sloping wall portions 44 and 45 disposed on either side of the trunnion receiving recesses 40. The slope of these walls away from the horizontal provides a space in which the ring member 34 may pivot when tilting on the trunnions 35, as shown in Figure 3.

From the foregoing description it is seen that there is provided in this invention a ball joint in which a stud is arranged to rotate freely on anti-friction bearings and to tilt relative to the housing in two different planes, tilting in each plane being capable of being carried out independently of tilting in the other.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint structure comprising a housing having an internal bearing wall accommodating tilting movements and converging to a reduced diameter opening in the housing, a stud having a shank portion projecting freely through said opening and a head portion disposed in said housing, a seat tiltable on said bearing wall of the housing and surrounding said shank portion of the stud, a ring member surrounding said shank portion of the stud between said head portion and seat and having diametrically opposed bearing arms tiltably mounted on said seat, anti-friction bearings between said ring member and the head portion of said stud, said stud being rotatable about its own axis on said anti-friction bearings, tiltable with said ring member about the axis of said bearing arms relative to said seat and tiltable with said seat on said bearing wall of the housing, and means urging said stud, said anti-friction bearings, said ring member and said seat into operative relation in said housing.

2. A joint structure comprising a housing, a stud having a head portion disposed in said housing, a ring member having diametrically opposed bearing arms and associated with said stud for tilting therewith about the axis of the bearing arms in a first plane, a seat member pivotally engaging said housing for pivoting therein and having an aperture therethrough receiving said stud, the shank of said stud abutting the side of said aperture to effect tilting of said seat member in a second plane, an anti-friction bearing element disposed between said ring member and the head portion of said stud to facilitate the rotation thereof and means abutting the end portion of said stud for urging said ring member and said seat member into engagement with said anti-friction bearing element and said seat member against said housing.

3. A joint structure comprising a housing, a stud having a shank projecting from said housing and a head on the end of said shank disposed in said housing, a ring member in said housing encircling the shank of said stud and having diametrically opposed trunnions, a seat member receiving the shank of the stud therethrough and tiltable in said housing, said seat member having bearing portions tiltably mounting said trunnions, anti-friction bearings between the ring member and the head of the stud, said stud being rotatable about its own axis on said anti-friction bearings in said seat member, tiltable in one plane relative to the seat member about the trunnions of said ring member as an axis and abutting the seat member when tilted in another plane to tilt the seat member in the housing, and resilient means acting against the head of said stud to urge the head against the anti-friction bearings, to urge the anti-friction bearings against the ring member, to urge the trunnions of the ring member against the seat member, and to urge the seat member against the housing for maintaining all of the parts in operative bearing relation.

4. A joint structure comprising a housing having a central cavity with an internal bearing wall accommodating tilting movements and an opening giving access to said cavity, a stud having a head portion disposed in said cavity and a shank portion projecting freely through said opening, a seat member tiltable on said bearing wall of the housing and having a central aperture receiving the shank portion of the stud therethrough, a ring member disposed about the shank portion of said stud and having trunnion portions extending radially outwardly therefrom and tiltably mounted in said seat member, said stud being rotatable about its own axis on said anti-friction bearings, being tiltable in said central aperture of the seat member on said trunnions and being tiltable with the seat member on the bearing wall of said housing, and means for urging the ring member, the seat member, the anti-friction bearings, and the stud into cooperating bearing relation.

5. A joint structure comprising a housing, a stud having a head portion disposed in said housing and a shank portion projecting from said housing, an anti-friction bearing assembly associated with said stud in said housing to facilitate rotation thereof, one of the raceways of said bearing assembly having trunnions, means in said housing tiltably receiving said trunnions for supporting the raceway in tilting relation in the housing, the other of said raceways of said bearing assembly being movable with said stud, and means acting on the head of said stud for urging the stud against said anti-friction bearing assembly and for urging the trunnions against the supporting means in the housing, whereby said stud is rotatable about its own axis on said anti-friction bearing assembly and is tiltable about the axis of said trunnions.

6. A joint structure comprising a housing having an internal bearing wall accommodating tilting movements and an opening giving access to said wall, a stud having a shank projecting freely through said opening and a head disposed in said housing, a ring member in said housing disposed about said shank, a seat member tiltable on said bearing wall of the housing and having an opening therethrough receiving said shank of the stud, said opening in said seat member being elongated in one direction to permit the stud to tilt relative to the seat member, means tiltably mounting said ring member on said seat member for accommodating movement of the stud in the direction of elongation of said opening in the seat member, and resilient means for urging the stud head into operative relation with the ring member, for urging the ring member into operative relation with the seat member, and for urging the seat member into operative relation with the bearing wall of the housing.

7. A joint structure comprising a housing having a cavity with a segmental spherical bearing surface, a stud having a head portion and tiltably disposed in said housing, a ring member having an opening for receiving the shank of said stud for free rotation of the stud therein or for tilting movement of the ring member with said stud, a seat member having an opening for receiving the shank of said stud for free rotation therein and for pivoting of said seat member with said stud, said seat member having a segmental spherical bearing surface, in tilting bearing contact with the segmental spherical bearing surface of said housing, the opening in said seat member being elongated in one direction to permit said stud to move therein when tilting with said ring member without moving said seat member, an anti-friction bearing disposed between the head portion of said stud and said ring member to facilitate rotation of said stud, and means abutting said head portion of said stud for urging said stud against said anti-friction bearing.

8. A joint structure comprising a housing having a bearing wall accommodating tilting movements and converging to an opening giving access to the housing, a stud having a shank portion extending freely through said opening and a head portion disposed in said housing, a seat disposed about the shank portion of said stud and having an external bearing wall tiltable on said bearing wall of the housing, a ring encircling said shank portion of the stud between the seat and stud head portion and having diametrically opposed trunnions tiltably mounted on said seat, said seat having a slot in the external wall thereof, a pin carried by said housing projecting into said slot for holding the seat against rotation about its own axis in the housing, said stud being tiltable in said seat about the axis of said trunnions and being tiltable with said seat on said bearing wall of the housing about an axis determined by said slot, and means acting on the head of the stud to maintain the stud, the ring, the seat, and the housing in proper bearing relation.

9. A joint having a first pair of bearing surfaces accommodating tilting movements in one plane, a second pair of bearing surfaces accommodating tilting movements in another plane, a third pair of bearing surfaces accommodating rotation and resilient means urging the surfaces into bearing relation.

10. A joint structure comprising a housing having an internal bearing wall accommodating tilting movements and converging to an opening giving access to the housing, a stud having a shank projecting freely through said opening and a head on the end of said shank in said housing, a ring in said housing encircling said shank, a seat disposed about said shank and tiltably mounted on said internal bearing wall of the housing, means tiltably mounting said ring on said seat, and anti-friction bearings between said head of the stud and said ring, whereby said stud is rotatable about its own axis on said anti-friction bearings, is tiltable relative to said seat with said ring about the axis of said means, and is tiltable with said seat on said housing bearing wall in another plane.

JAMES H. BOOTH.

REFERENCES CITED

The following references are of record in the file of this patent:

FOREIGN PATENTS

| Number | Country | Date |
| --- | --- | --- |
| 17,278 | Australia | Sept. 25, 1934 |
| 18,369 | Australia | Feb. 25, 1935 |